United States Patent
Brumm

[11] 3,758,186
[45] Sept. 11, 1973

[54] METHOD OF COPYING HOLOGRAMS

[75] Inventor: Douglas B. Brumm, Ann Arbor, Mich.

[73] Assignee: The Battelle Development Corporation, Columbus, Ohio

[22] Filed: Nov. 30, 1966

[21] Appl. No.: 598,008

[52] U.S. Cl. .................................. 350/3.5, 355/2
[51] Int. Cl. ........................................ G02b 27/00
[58] Field of Search ........................... 350/3.5; 355/2

[56] References Cited
OTHER PUBLICATIONS

Rogers, Proc. of Royal Soc. of Edinburgh, Vol. 63, Sec. A, 1952, pp. 193-221 (pp. 206-209, 217 relied upon)
Harris et al., Applied Optics, Vol. 5, No. 4, April 1966, pp. 665-666

*Primary Examiner*—David Schonberg
*Assistant Examiner*—Ronald J. Stern
*Attorney*—Woodcock, Washburn, Kurtz and Mackiewicz

[57] ABSTRACT

A method of copying holograms wherein the original hologram and the detector are spaced apart at least a couple of wavelengths during the copying so that the undiffracted or 0-order wavefront transmitted by the original hologram can serve as the reference beam thus eliminating the need for introducing a separate beam.

2 Claims, 4 Drawing Figures

METHOD OF COPYING HOLOGRAMS

This invention relates to the production of copies from a hologram and has for an object the provision of a method using either the real or virtual image or both reconstructed from a hologram as an object for a second hologram, with the undiffracted or zero-order wavefront being used as the reference beam. The present invention permits the first hologram to be copied without requiring close contact between the two emulsions involved.

It is frequently necessary to make a large number of copies from an original hologram. Heretofore the methods of duplicating or reproducing holograms have utilized contact printing techniques. In employing such techniques, if a high resolution photographic emulsion is placed very close, i.e., within a few microns, to the original hologram emulsion and then exposed to a light source, subsequent photographic development will produce a copy of the original hologram which will reconstruct an image of the original object when illuminated by a source of monochromatic spatially coherent light. The contact printing method requires that the two emulsions involved be close together during the exposure in order to prevent a loss of resolution due to diffraction of the incident light by the original hologram. If close contact is not maintained during the exposure, diffraction in the region between the two emulsions will seriously deteriorate the fringe pattern recorded by the emulsion of the copy. This yields a hologram from which a good reconstruction cannot be obtained. The difficulty of obtaining sufficiently close contact between the two emulsions is the major disadvantage of the contact printing method of copying holograms. Holograms have been copied by such methods but specialized equipment is needed, such as a vacuum frame or a printing frame in which the film can be pressed tightly against the hologram emulsion. Such methods have also required the flexibility of film as distinguished from the use of plates.

In accordance with the present invention, a hologram copy is produced by generating a new fringe system rather than by duplicating the fringes of the original hologram. This new fringe pattern is not the same as the original fringe pattern but it does reconstruct an image of the original object which is the desired result. This is achieved by illuminating the original hologram with a monochromatic spatially coherent light such as, for example, a monochromatic plane wave in such a way that a good reconstructed image is obtained. An unexposed, high-resolution emulsion film or plate is then placed behind the hologram in such a way that it intercepts the undiffracted wavefront passing through the hologram as well as the reconstructed image wavefront which is diffracted or its conjugate. These wavefronts then interfere to produce a new set of fringes. This new fringe system, when properly illuminated, will reconstruct an image of the original object and its conjugate.

For purposes of explanation, it will be assumed that the original hologram is infinitely thin and that the copy hologram is made while actually in contact with the original hologram. The wavefront passing through the original hologram when it is illuminated with a monochromatic plane wavefront has three components of interest, the undiffracted or zero-order wavefront and the two first-order wavefronts which are complex conjugates of one another. These three component wavefronts interfere in pairs to produce the three components of the total fringe system formed on the copy hologram. Only two of these components are of interest, those formed by interference between the undiffracted wavefront and each of the diffracted wavefronts. After photographic development, each of these component patterns will reconstruct wavefronts corresponding to the original object wavefront and the conjugate when illuminated with a monochromatic plane wavefront. Thus, there are two reconstructed virtual images and two conjugate images. For the conditions assumed, however, i.e., two emulsions in contact during exposure of the copy, the two virtual images coincide and similarly for their conjugates. Now if the emulsions are separated by a distance d during exposure of the copy, the virtual images and their conjugates will be separated by 2d in the reconstruction. This image doubling will not usually occur in practice, however, as hologram emulsions cannot be infinitely thin. Most holograms will not reconstruct both the virtual image and its conjugate for the same hologram orientation because of the Bragg effect; i.e., the original hologram can be oriented to optimize one image or the other, but not both simultaneously. Thus, only two wavefront components will interfere in the copy hologram plane, the undiffracted wavefront and one of the first-order wavefronts. Thus, the copy hologram will contain only one set of fringes and will reconstruct one virtual image and one conjugate image.

The present method actually involves making a new hologram with the undiffracted wavefront serving as the reference beam and the reconstructed image of the original object or its conjugate taking the place of an actual object. While previous methods have been proposed for making a hologram of a hologram, such methods have required the introduction of a separate reference beam. The present process does not require a separate reference beam and no mirrors or beam splitters are required. In one of the prior art methods, the real image produced by a hologram was used as an object for a second hologram. Of course, the virtual image could be used in a similar manner. With such method, using either image, it was necessary for the original hologram and the unexposed plate or detector to be far enough apart in order to allow the detector to intercept only the diffracted wavefront corresponding to the desired image. This eliminated interference with the undiffracted wavefront and a conjugate diffracted wavefront. This wide separation distance between the original hologram and the detector was also required to allow introduction of the reference beam.

The present invention does not require a separate reference beam nor the wide separation distance between the original hologram and the detector. Furthermore, it does not require the close contact between the two emulsions of the original hologram and the detector as required by prior contact printing processes. In accordance with the present invention, the original hologram and the detector are spaced apart a predetermined distance sufficiently large so that the undiffracted or zero-order wavefront transmitted by the original hologram can serve as the reference beam thus eliminating the need for introducing a separate beam. For example, the spacing should be at least a couple of wavelengths for the type of copying described here.

More particularly, the present invention provides a method of copying a hologram of an object comprising the steps of placing a hologram and a detector in parallel planes so that the recording surfaces thereof are spaced apart a predetermined distance, directing an illuminating beam of monochromatic spatially coherent light onto the recording surface of the hologram to produce a reconstructed image of the original object, using the illuminating beam as a reference beam to interfere with the image wavefront to produce an interference pattern, and recording the interference pattern on the detector.

In accordance with one aspect of the invention, the reconstructed image formed by the hologram is produced by light that is diffracted and transmitted through the hologram to produce a front-beam copy of the hologram.

In accordance with a further aspect of the invention, the reconstructed image formed by the hologram is produced by light reflected from the hologram to produce a back-beam copy of the hologram.

In accordance with a further aspect of the invention, one interference pattern is produced from the image wavefront and the illuminating beam which is transmitted only through the hologram, and a second interference pattern is produced from the image wavefront and the illuminating beam which is transmitted through the detector and reflected back to the detector to produce a composite front-beam and back-beam hologram copy.

In accordance with another aspect of the invention, one interference pattern is produced from the image wavefront and the illuminating beam which is incident on the detector and a second interference pattern is produced from the image wavefront and the illuminating beam which is transmitted through the hologram and reflected back to the detector to produce a composite front-beam and back-beam hologram copy.

For a more detailed disclosure of the invention and for further objects and advantages thereof, reference is to be had to the following description taken in conjunction with the accompanying drawings, in which.

Wavefront reconstruction using coherent radiation is described in U. S. Pat. application, Ser. No. 361,977, filed Apr. 23, 1964 and now U.S. Pat. No. 3,506,327 and in U. S. Pat. application, Ser. No. 503,993, filed Oct. 23, 1965 and now abandoned. The holographic or wavefront reconstruction process, in its simplest form, includes directing a first beam of coherent light onto an object and positioning a detector, usually a photographic plate, to receive the light emanating from the object. A second beam of light, coherent with respect to the first beam, is directed at some selected angle to the light emanating from the object and onto the detector causing the light from the object and the light of the second beam, called the reference beam, to form a pattern of interference fringes at the detector which the detector records. This pattern of interference fringes is referred to in the art as a hologram and may be reconstructed to produce a three-dimensional real image or virtual image of the original object. The reconstruction occurs when the hologram is illuminated with coherent light. When the hologram is produced by applying the object bearing beam and the reference beam to the same side of the detector, the hologram thus produced is referred to in the art as a front-beam hologram. In reconstructing an image of the original object from a front-beam hologram the coherent light is directed upon the hologram and the image beam is transmitted through and diffracted by the front-beam hologram. Such a technique is disclosed in the article entitled "Photography by Laser" by Emmett N. Leith and Juris Upatnieks in Scientific American for June, 1965, pages 24–35.

Holograms may also be produced of the back-beam type wherein the object bearing beam is directed onto one side of the detector while the reference beam is directed onto the reverse side of the detector. Holograms of the back-beam type are disclosed in co-pending U. S. Pat. application, Ser. No. 538,854, filed Mar. 30, 1966, by Nile F. Hartmann. In reconstructing holograms of the back-beam type, light is directed upon the hologram and the image beam is reflected from the back-beam hologram. Holograms of the back-beam type are also disclosed in "Color Holograms for White Light Reconstruction" by J. Upatnieks, J. Marks and R. Fedorowicz, Applied Physics Letter, Vol. 8, No. 11 (1966), Page 286.

Figure 1:
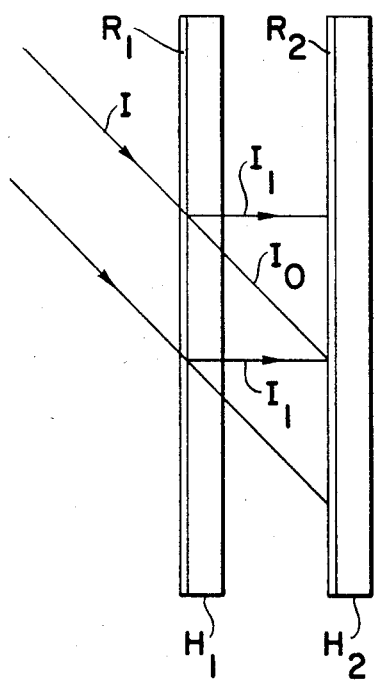
FIG. 1 is a diagramatic view of a system for copying front-beam holograms in accordance with the present invention.

Referring to FIG. 1, the present invention has been illustrated in connection with copying a hologram of the front-beam type. The original hologram $H_1$ has been produced in accordance with the aforedescribed front-beam method and the detector $H_2$, preferably in the form of an undeveloped photographic plate, is positioned a predetermined distance from the hologram $H_1$ and in a plane parallel thereto. As may be seen in FIG. 1, the recording surfaces $R_1$ and $R_2$, which in the case of photographic plates are emulsion surfaces, are positioned to the left hand side of the hologram $H_1$ and the detector $H_2$. The predetermined distance between the recording surfaces $R_1$ and $R_2$ should be at least a couple of wavelengths and in practice the hologram $H_1$ and the detector $H_2$ may be placed in contact with each other so that the recording surfaces $R_1$ and $R_2$ will be separated by a distance corresponding to the thickness of the emulsion backing on hologram $H_1$. For example, with a photographic plate, such as a Kodak 649F, and with the recording surface $R_2$ against the backing of the hologram $H_1$, the recording surfaces $R_1$ and $R_2$ will be separated by a distance of approximately one-eighth inch or one-fourth inch depending upon the type of plate used. It is to be understood taht in FIG. 1 the hologram $H_1$ and the detector $H_2$, have been illustrated as separated by a greater distance for purposes of clarity in illustrating the ray diagrams. This is also the case in FIGS. 2–4.

In producing a copy of the front-beam hologram $H_1$, the detector $H_2$ is positioned as shown in FIG. 1 so that the illumination is inclined at an angle so as to produce a bright image from the hologram $H_1$. In practice, image doubling does not usually occur as the hologram emulsions are not infinitely thin. Most holograms will not reconstruct both the virtual image and its conjugate for the same hologram orientation because of the Bragg effect; i.e., the original hologram can be oriented to optimize one image or the other but not both simultaneously. As may be seen in FIG. 1, the illuminating beam I when it strikes the surface $R_1$ of the hologram $H_1$ is divided into an image beam $I_1$ which is diffracted and the undiffracted or zero-order beam $I_0$. The beam $I_1$ produces a reconstructed image of the original object and, thus, serves as the object beam in producing the second hologram $H_2$. The illuminating beam I also serves as the reference beam $I_0$ to interfere with the image wavefront $I_1$ to produce an interference pattern which is recorded on the detector or second hologram $H_2$. Good quality hologram copies have been produced with the arrangement illustrated in FIG. 1 and using light from a helium-neon laser (6,328 Angstroms).

Figure 2:
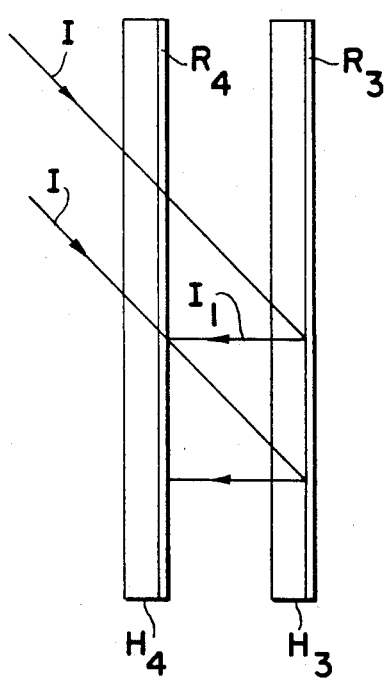
FIG. 2 is a diagramatic view of a system for copying back-beam holograms in accordance with the present invention.

Referring to FIG. 2, there is illustrated a modification of the invention wherein an original hologram $H_3$ of the back-beam type is copied on a detector $H_4$. It will be noted in FIG. 2 that the recording surfaces $R_3$ and $R_4$ are disposed on the right hand sides of the members $H_3$ and $H_4$, respectively. As in the previous arrangement of FIG. 1, the hologram $H_3$ and the detector $H_4$ are positioned parallel to each other and are spaced apart a predetermined distance which in practice is preferably the thickness of the backing on the hologram $H_3$. In this arrangement the original back-beam hologram $H_3$ is illuminated with a beam I of coherent light which passes through the detector $H_4$ and the reconstructed image formed by the hologram $H_3$ is produced by light $I_1$ reflected from the hologram $H_3$ to the recording surface $R_4$ of detector $H_4$. The illuminating beam I is used as a reference beam to interfere with the image wavefront $I_1$ to produce an interference pattern. It will be noted that the image wavefront $I_1$ and the reference beam I engage the recording surface $R_4$ on opposite sides. Thus the interference pattern recorded on the detector $H_4$ is of the back-beam type and is referred to as a back-beam copy of the hologram.

Figure 3:
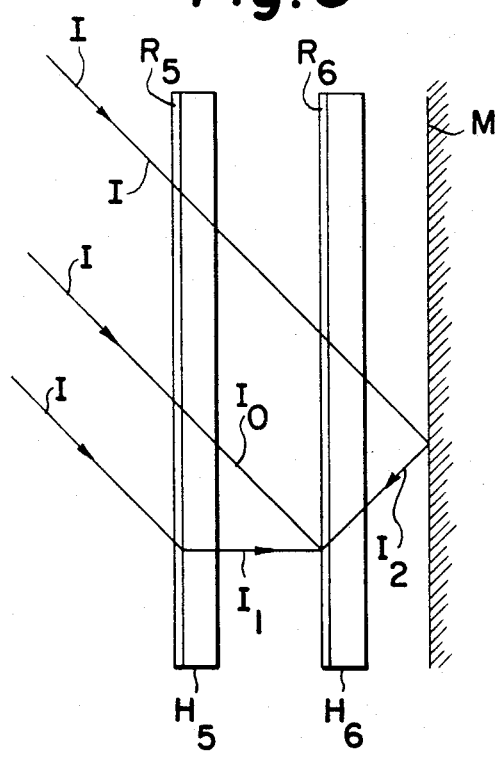
FIG. 3 is a diagramatic view of a system for producing a composite front-beam and back-beam hologram copy from a front-beam original.

In FIG. 3, there is illustrated a method of copying a front-beam hologram $H_5$ so that the copy $H_6$ is a composite front-beam and back-beam hologram. As in FIG. 1 the hologram $H_5$ is a front-beam hologram and it is in a parallel plane spaced from the detector $H_6$. The recording surfaces $R_5$ and $R_6$ are both positioned on the left hand sides of the members $H_5$ and $H_6$ respectively. A reflecting surface such as a mirror M is positioned to the right of the detector $H_6$. The front-beam hologram copy on the detector $H_6$ is produced in the same manner as previously described in connection with FIG. 1. The illuminating beam I engages the recording surface $R_5$ to produce an image beam $I_1$ which carries the reconstructed image of the original object. The image beam $I_1$ engages the recording surface $R_6$ of the detector $H_6$ and interferes with the illuminating beam which is transmitted through the hologram $H_5$ to serve as a reference beam $I_0$ to produce an interference pattern on the recording surface $R_6$. This interference pattern is recorded on the recording surface $R_6$ as a front-beam hologram. It will also be seen in FIG. 3 that the illuminating beam I also is transmitted through the hologram $H_5$ and the detector $H_6$ where it strikes the reflecting surface of the mirror M and is reflected through the detector $H_6$ onto the recording surface $R_6$. This reflected beam $I_2$ in conjunction with the image beam $I_1$ produces a second interference pattern of the back-beam type which is recorded on the detector $H_6$. Thus the detecor $H_6$ is provided with a composite front-beam and back-beam hologram copy of the original hologram $H_5$.

Figure 4:
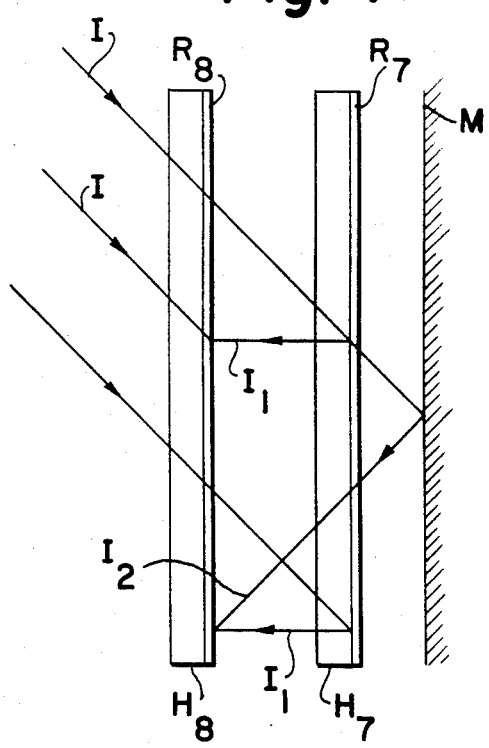
FIG. 4 is a diagramatic view of a system for producing a composite front-beam and back-beam hologram copy from a back-beam original.

In FIG. 4 there is illustrated an arrangement for producing a composite front-beam and back-beam hologram copy from an original back-beam hologram. The original hologram $H_7$ and the detector $H_8$ are positioned in the same manner as previously described in connection with FIG. 2 and a mirror M is positioned to one side of the original hologram $H_7$. As in FIG. 2, the back-beam hologram copy is produced by cooperation of the illuminating beam I and the image beam $I_1$ which is reflected from the recording surface $R_7$ of the original hologram $H_7$ to produce an interference pattern on the recording surface $R_8$ of the detector $H_8$. This interference pattern is recorded on the detector $H_8$ and is of the back-beam type. The illuminating beam also passes through both the detector $H_8$ and the hologram $H_7$ where it strikes the reflecting surface of the mirror M and is reflected back through the hologram $H_7$ onto the recording surface $R_8$ of the detector $H_8$. This reflected beam $I_2$ acts as a reference beam which interferes with the image beam $I_1$ to produce an interference pattern of the front-beam type which is recorded on the surface $R_8$ of detector $H_8$. Thus it will be seen that the detector $H_8$ is provided with a composite front-beam and back-beam hologram copy of the original hologram $H_7$.

From the foregoing, it will be seen that copy holograms can be made without any special contact printing apparatus. It is only necessary for the original hologram to be illuminated properly and for the detector, such as a film or plate, to be placed behind the original hologram in such a way that it intercepts the undiffracted wavefront and at least one of the diffracted wavefronts.

It is to be understood the invention is not limited to the specific arrangements shown and that changes and modifications may be made within the scope of the appended claims.

What is claimed is:

1. A method of copying an off-axis hologram of the front-beam type comprising the steps of:

Directing an illuminating beam consisting of monochromatic spatially coherent light onto a recording surface of the off-axis front-beam hologram to an angle so as to produce on the opposite side thereof a diffracted image beam at a finite angle with respect to an undiffracted portion of said illuminating beam passing through said recording surface, placing a detector having a recording surface sensitive to coherent light and capable of detecting interference fringes with respect to the front-beam hologram so that the recording surfaces thereof are spaced apart at least a couple of wavelengths and so that the detector receives both the diffracted image beam and the undiffracted portion of the illuminating beam directly from the recording surface of the hologram, recording an interference pattern on the detector produced by the interaction of the undiffracted portion of the illuminating beam and the diffracted image beam as a front-beam copy of the front-beam hologram, positioning a reflector on the opposite side of the recording surface of the detector from the hologram to receive an undiffracted portion of said illuminating beam passing through the recording surfaces of both the hologram and the detector for reflection back to the detector, and recording a second interference pattern on the detector produced by the interaction of the reflected undiffracted portion of the illuminating beam and the diffracted image beam to produce a composite front-beam and back-beam hologram copy.

2. A method of copying an off-axis hologram of the back-beam type comprising the steps of:

directing an illuminating beam of monochromatic spatially coherent light onto the recording surface of the off-axis back-beam hologram at an angle so as to produce for reflection therefrom a diffracted image beam at a finite angle with respect to said illuminating beam, placing in the path of said illuminating beam a detector at least a couple of wavelengths from the recording surface of said hologram to receive the diffracted image beam reflected from the hologram, the detector being sensitive to coherent light and capable of detecting interference fringes, recording an interference pattern on the detector produced by the interaction of the illuminating beam and the reflected diffracted image beam as a back-beam copy of the back-beam hologram, positioning a reflector on the opposite side of the recording surface of the hologram from the detector to receive an undiffracted portion of said illuminating beam passing through the recording surfaces of both the hologram and the detector for reflection back through the hologram to the detector, and recording a second interference pattern on the detector produced by the interaction of the reflected undiffracted portion of the illuminating beam and the reflected diffracted image beam to produce a composite front-beam and back-beam hologram copy.

* * * * *

UNITED STATES PATENT OFFICE
CERTIFICATE OF CORRECTION

Patent No. 3,758,186  Dated September 11, 1973

Inventor(s) Douglas B. Brumm

It is certified that error appears in the above-identified patent and that said Letters Patent are hereby corrected as shown below:

Column 3, line 58, change "and now abandoned" to --and now U.S. Pat. No. 3,580,655--

Column 4, line 56, correct the spelling of "that".

Column 6, line 45, the word "to" should be --at--.

Signed and sealed this 25th day of December 1973.

(SEAL)
Attest:

EDWARD M. FLETCHER, JR.
Attesting Officer

RENE D. TEGTMEYER
Acting Commissioner of Patents